United States Patent
Jansson et al.

[11] 3,795,501
[45] Mar. 5, 1974

[54] METHOD OF SHAPING GLASS SHEETS TO SHARP BENDS

[75] Inventors: Robert A. Jansson, Pittsburgh; Thomas J. Reese, Sarver, both of Pa.

[73] Assignee: PPG Industries, Inc., Pittsburgh, Pa.

[22] Filed: Mar. 29, 1972

[21] Appl. No.: 239,032

[52] U.S. Cl.................... 65/106, 65/273, 161/185
[51] Int. Cl............................................ C03b 23/02
[58] Field of Search 65/103, 106, 107, 273; 161/35, 161/185, 199

[56] References Cited
UNITED STATES PATENTS

| | | | |
|---|---|---|---|
| 2,111,392 | 3/1938 | Galey | 65/273 |
| 3,352,655 | 11/1967 | Barch | 65/103 X |
| 2,871,623 | 2/1959 | Marini | 65/107 X |

*Primary Examiner*—Arthur D. Kellogg
*Attorney, Agent, or Firm*—Edward I. Mates; Thomas F. Shanahan

[57] ABSTRACT

Simultaneously bending pair of glass sheets having a sharply bent portion extending across a portion of the sheet, using a combination of locally applied electrical resistance heating in said sharply bent portion in combination with general overall heating so that a pair of glass sheets bent simultaneously do not fuse together and can be separated after they are shaped, then assembled with a layer of plastic interlayer material therebetween and laminated.

18 Claims, 6 Drawing Figures

METHOD OF SHAPING GLASS SHEETS TO SHARP BENDS

BACKGROUND OF THE INVENTION

This invention relates to fabricating shaped windows, preferably of the type suitable for use as automobile windows. The present invention has been specifically utilized in connection with making V-shaped laminated windshields in which a sharply bent portion of the installed windshield or backlight extends transversely of an elongated window from one longitudinal side edge thereof to its other longitudinal side edge. The V-shaped window is symmetrical about its sharply bent portion. The present invention is also suitable for use in a compound windshield or backlight or sidelight in which one region of the window is sharply bent into the roof of the vehicle in a substantially horizontal plane from another portion that extends across the front, side, or rear of the vehicle. In addition, the present invention is also suitable for use in fabricating rear-quarter windows for station wagons having a main portion extending forward of the vehicle from a sharply bent corner and a rear portion extending along the rear of the vehicle from the sharply bent corner.

In addition to automotive glass, the present invention is also suitable for use in bay windows for buildings which include a flat central portion spaced outward from the frame of the building and angularly disposed flat glass end portions extending inward from each end of the central portion. Other glass shapes having sharply bent portions are also made possible by the present invention.

Various techniques have been developed to produce a windshield having a sharply bent region. Various patents such as U. S. Pat. Nos. 2,111,392 to Henry J. Galey; 2,176,999 to Robert A. Miller; 2,215,228 to James G. Oliver; and 3,248,195 to James S. Golightly and Harold E. McKelvey suggest various methods and apparatus employing electrical heaters for imparting a relatively sharp bend to a glass sheet. Furthermore, U. S. Pat. No. 2,871,623 to Herman R. Marini and U. S. Pat. No. 3,260,584 to Alfred E. Badger suggest using a heat absorbing material which reradiates heat into a portion to be relatively sharply bent compared to other portions. The heat absorbing material is removed after the glass is shaped. Furthermore, it is also well known to bond electroconductive material onto a surface of a glass sheet in the form of an electrical resistance heating circuit. U. S. Pat. Nos. 2,557,893 to Cyril S. Linder; 2,569,773 to Leighton E. Orr; 2,648,752 to Arnold E. Saunders; 2,648,754 to William O. Lytle; 2,710,900 to Cyril S. Linder; 2,877,329 to Romey A. Gaiser; 2,993,815 to A. W. Treptow; 3,287,684 to Albert Armbruster; 3,302,002 to Robert A. Warren; 3,467,818 to John D. Ballentine; and 3,484,583 and 3,484,584 to Hugh E. Shaw provide examples of electroconductive heating circuits bonded to a surface of a ceramic or glass sheet. To the best of our knowledge, bus bars supplying current to the electrical heating circuit are more electroconductive than the heating circuit in prior art circuits, even at portions connecting the bus bars to the circuit.

It has even been suggested in the prior art to groove the glass in the region of sharp bending. U. S. Pat. Nos. 3,241,936 and 3,281,227 to Herbert A. Leflet, Jr. depict this technique. Such grooving weakens the glass.

Sharp localized bending has also been accomplished by bonding a heat reflecting coating on a portion of a surface opposite the surface facing a heat source. British Pat. No. 942,132 to George Hubble describes such a method.

A method of localized heating using an electroconductive element bonded to a portion of a glass sheet surface is found in Canadian Pat. No. 867,466 to Friedrich Jochim et al.

It has been found that heating circuits in the past have been interconnected between bus bars disposed along the opposite edges of the glass sheet. In the past, the bus bars have been of greater electroconductivity than that of the heating circuit elements in order to be able to have the voltage supply as great a proportion of energy to the heating elements with minimum loss of electrical energy to each bus bar. Such prior art configurations supplied power at maximum efficiency to the heating elements in the region where heat was desired.

In using a single elongated electroconductive heating strip with its ends connected to electrodes for applying electrical energy to heat the glass sheet locally along the line of the elongated strip of electroconductive material in the fabrication of V-shaped windows, sometimes breakage was experienced. The present invention provides a method of reducing this breakage to a considerable extent.

SUMMARY OF THE INVENTION

The present invention provides a window comprising a glass sheet having a sharply bent portion extending across a portion of the sheet with a shape necessary for a V-shaped windshield using a combination of overall heating of the glass sheet with a novel setup of electrical resistance heating to accentuate heating in the sharply bent portion.

According to the present invention, the localized electrical resistance heating is supplied by a pair of flexible strips of electroconductive material applied along the line of sharp bending. One of the strips of electroconductive material is applied between the glass sheets along the line of sharp bending. The other strip is applied parallel to the first strip along the upper surface of the upper glass sheet so that a pair of glass sheets and strips of electroconductive material may be assembled in bending relation to an outline bending mold and electrodes brought into contact with the strips to apply electrical energy locally at the proper phase of the bending cycle. The flexible strips may be composed of removable material, such as metal strips, or of a more flexible material such as carbon tape.

The resulting laminated window comprises two glass sheets conforming in shape and outline to one another with a layer of flexible plastic resin such as a polyvinyl acetal resin or a polyurethane resin adhering the glass sheets to one another in aligned relationship.

While the resulting laminated window described herein may be a V-shaped windshield having a sharply bent portion extending across the width of the glass sheet to form two main portions symmetrically arranged with respect to said sharply bent portion, the present invention is equally adapted for any configuration of glass that incorporates a sharply bent portion extending completely across a glass sheet from one edge to an edge opposite thereto.

When both glass sheets have a strip of electroconductive material applied along a surface thereof, considerable improvement in the efficiency of the glass bending operation takes place. The arrangement of the present invention requires a lower voltage for localized heating, which prevents the glass sheets from fusing to one another when they are bent as a pair while mounted in stacked, aligned relationship on a bending mold.

The use of a single, electroconductive heating strip arranged either between the glass sheets or along a surface of one sheet facing away from the other sheet caused occasional breakage while bending glass sheets in pairs. The addition of a second electroconductive strip aligned with the first strip according to the present invention has reduced the frequency of glass breakage.

The details of the present invention will be understood better in the light of a description of illustrative preferred embodiments and variations thereof that follows. In the drawings that form part of the description, like reference numbers refer to like structural elements.

DESCRIPTION OF THE PREFERRED EMBODIMENTS

Figure 1:
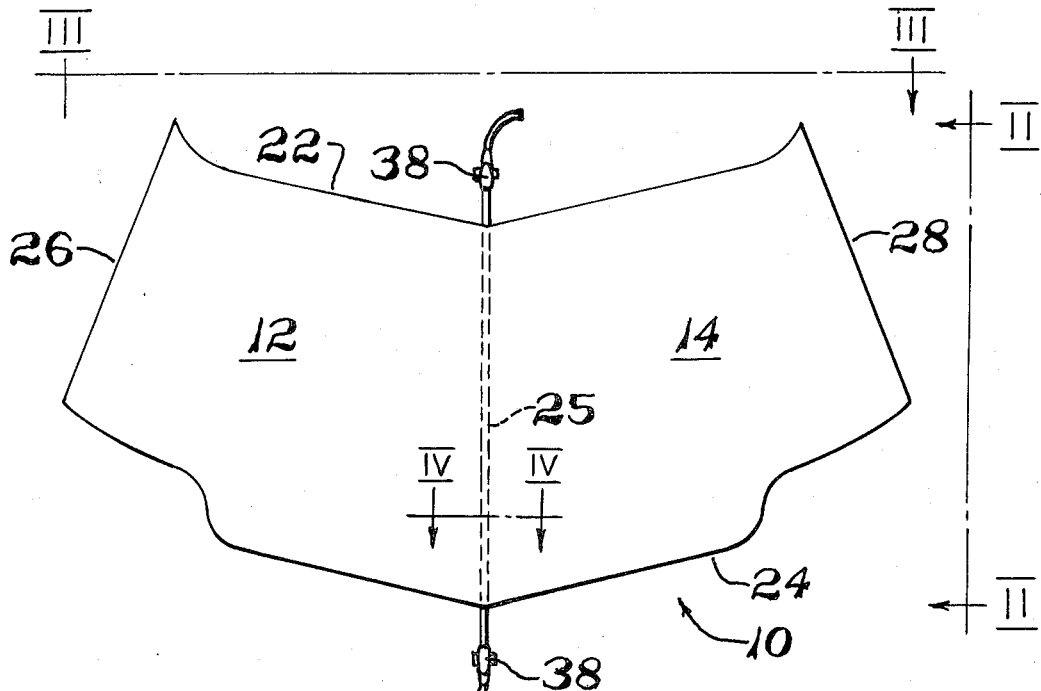
FIG. 1 is a front view of an assembly of elements comprising parts of a V-shaped windshield showing how a pair of electroconductive strips are arranged relative to the glass sheets while shaping the pair of glass sheets according to one embodiment of the present invention.
Figure 2:
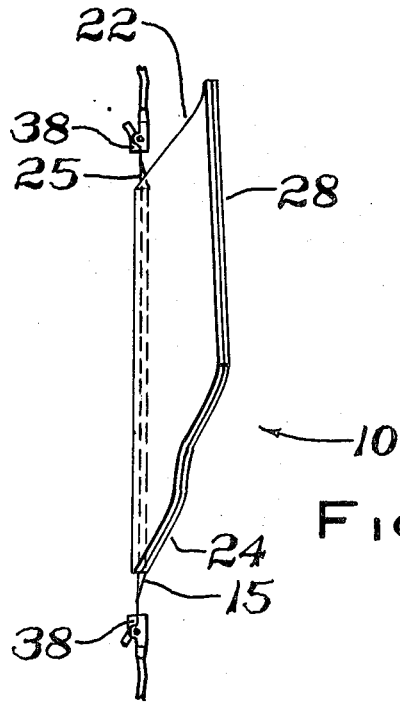
FIG. 2 is an end elevation of the assembly of FIG. 1, taken along the lines II—II of FIG. 1 with the assembly turned slightly.
Figure 4:
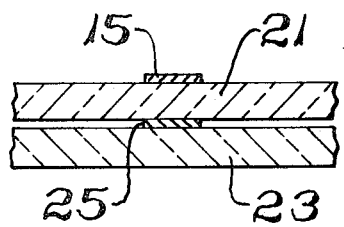
FIG. 4 is a fragmentary, enlarged, sectional view taken along the lines IV—IV of FIG. 1.
Figure 3:
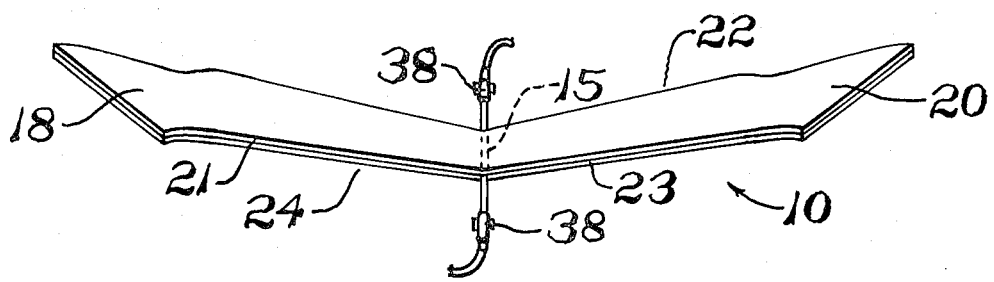
FIG. 3 is a top view taken along the lines III—III of FIG. 1 with the assembly turned slightly.

In the drawings, reference number 10 refers to an assembly of elements comprising parts of a so-called V-shaped windshield having two main portions 12 and 14 sharply bent with respect to one another along a transverse line of sharp bending to which are applied thin elongated heating strips of electroconductive material 15 and 25. The windshield may also comprise a pair of longitudinal end portions 18 and 20 that are bent with respect to their respective main portions 12 and 14. The windshield assembly comprises an upper glass sheet 21 and a lower glass sheet 23 mounted with their marginal edges comprising a top edge 22 and a bottom edge 24 interconnected by end edges 26 and 28 in alignment.

The longitudinally extending electroconductive strips 15 and 25 are applied along a portion of the flat glass sheets in parallel relation to one another along paths destined to become the sharply bent transverse portion between main portions 12 and 14 of the windshield. Strip 25 is applied to the upper surface of glass sheet 23, then glass sheet 21 is superimposed over glass sheet 23 with the strip 25 of electroconductive material disposed between glass sheet 21 and glass sheet 23. The other strip 15 is applied to the upper surface of glass sheet 21. Each of the strips 15 and 25 has an elongated extension portion extending beyond the opposite side edges of the windshield assembly for attachment to an electrode 38. The latter are connected to a voltage source (not shown) through a switch (not shown) to control the application of voltage to heating strips 15 and 25.

The top edge 22, the bottom edge 24, and the end edges 26 and 28 of the window are constructed and arranged to conform within a frame of an automobile windshield opening and, in a particular pattern for which the present invention was developed, has a sharp V-bend disposed centrally across the window from top edge 22 to bottom edge 24 such that the angle between main portion 12 and main portion 14 is 163 degrees at the top edge 22 gradually decreasing to 154 degrees at the bottom edge 24. The windshield is 32 inches wide at the sharply bent portion and each float glass sheet is approximately 100 mils thick.

Preferably, the heating strips of electroconductive material 15 and 25 are thin, flexible metal strips having an electroconductivity per unit length of between 0.01 and 0.25 ohms per inch. Particularly good results are obtained with a nichrome ribbon three-sixteenths inch wide, 0.005 inch thick and having a resistance per unit length of 0.58 ohms per foot (or approximately 0.05 ohms per inch), although any conductive metal in strip form that does not tarnish readily and that does not become bonded to the glass or react chemically with the glass at the elevated temperature range needed for bending is acceptable.

The glass sheets with the electroconductive heating strip and additional electroconductive strip applied thereto is mounted on a bending mold of an outline type and the glass supporting mold is subjected to an elevated temperature sufficient to heat the glass sheet to about the strain point of the glass and to begin to soften the glass sheets. When the glass reaches a suitable temperature in the vicinity of its strain point, voltage is applied along the elongated strips 15 and 25 to provide more intense localized heat along the glass portion adjacent the thin elongated heating strips. This heating arrangement causes the glass sheet to develop a sharp bend extending across the glass sheet portion adjacent the elongated heating strips. Preferably, at the same time, the rest of the glass conforms to the shape of an outline mold. However, if the bend is further complicated, as, for example, by the desire for bending the two main portions to complicated shapes, it may be necessary to perform the shaping in more than one stage. Such multiple stage bending, if needed, is well known in the art and forms no part of the present invention.

The conductive heating strips are preferably approximately three-sixteenths inch wide for use with glass sheets approximately 100 mils thick that are presently used in laminated windshields, when the electroconductive elements are metal strips. Metal strips less than one-eighth inch wide distort the glass and tend to fuse to the glass portion being bent sharply when sufficient electrical energy is supplied to induce the sharp bending required locally. On the other hand, metal strips one-fourth inch wide are not suitable for producing very sharp bends presently required.

Different glass sheet dimensions require different optimum cross-sectional areas for the heating strips to provide sufficient localized resistance heating. The strip must be sufficiently thin to avoid any optical distortion caused by the heating strip penetrating into the heat-softened portion undergoing sharpest bending so that it flexes as the glass forms a "V." In addition, the flexible metal strips must be sufficiently narrow so that the line of sharp bending is as narrow as possible so that it does not become necessary to cover the sharply bent portion with an opaque coating of such a width that it interferes with vision through the window. Presently, automobile designers are prepared to accept opaque coatings that hide any optical distortion or marking in the sharply bent portion of a V-shaped windshield provided the coating has a maximum width of approximately three-eights inch.

In fabricating a laminated window, two aligned glass sheets 21 and 23 with strips 15 and 25 arranged as in FIGS. 1 to 4 are loaded for simultaneous bending as a pair on a bending mold with a parting material to prevent fusion disposed therebetween. Electrodes 38 connected to a source of potential (not shown) are clamped to the extensions of strips 15 and 25 to provide a pair of parallel heating circuits along the upper surfaces of glass sheets 21 and 23.

Figure 5:
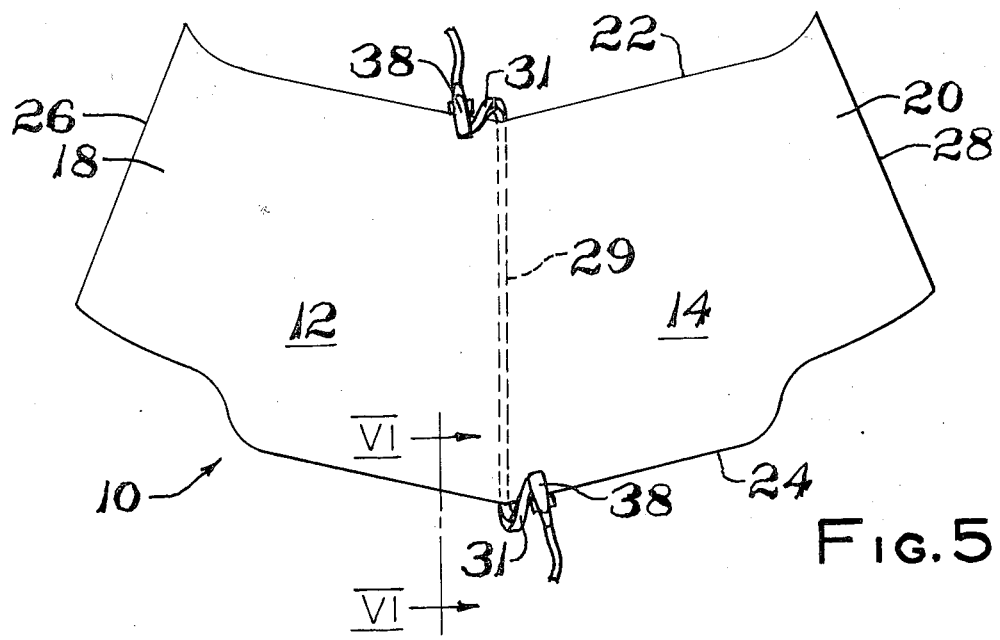
FIG. 5 is a view similar to FIG. 1, showing an alternate embodiment of the present invention.
Figure 6:
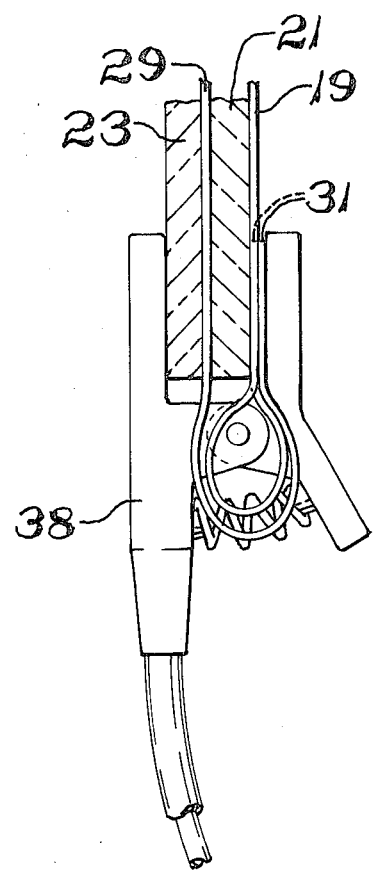
FIG. 6 is a fragmentary, enlarged, sectional view taken along the line VI—VI of FIG. 5.

If desired, either or both of the two heating strips 15 and 25 of the flexible metal may be replaced by a strip of conductive tape, such as tape 19 on the upper surface of the upper glass sheet 21 and an additional strip of conductive tape 29 on the upper surface of the lower glass sheet 23. The two strips 19 and 29 of electroconductive tape have extensions 31 at each end. The extensions are looped over the upper surface of the upper glass sheet 21 to provide an area along the edges of the assembly for clamping electrodes 38 against the conductive tapes. Such a system is depicted in FIGS. 5 and 6.

It is understood that it is not necessary to loop the extension 31 of the electroconductive tapes 19 and 29 around the edge of the upper glass sheet 21. They may both be looped about the edge of the lower sheet 23 or each tape may be looped about a separate sheet or any combination of loopings may be made at either end of each tape. An electrode 38 clamps each end of the looped extension against an exposed surface of the glass sheet-tape assembly.

One good feature of the flexible carbon tapes 19 and 29 is that since carbon tape is more flexible and has less density than a flexible metal strip, carbon tape is less likely to penetrate into or otherwise mark the glass sheet on which it is applied. However, a flexible metal strip is reusable, whereas a carbon tape may be used only one time.

The two glass sheets with the parting material disposed between their adjacent surfaces are supported in superimposed relation on an outline bending mold of the gravity sag type and heated to an elevated temperature. The parting material is preferably of the type disclosed and claimed in U. S. Pat. No. 2,725,320 to Florian V. Atkeson and James S. Golightly, which need not be removed after bending. The outline bending mold may be similar to that disclosed in U. S. Pat. No. 2,999,338 to Ronald E. Richardson except for the difference in shape of the outline shaping surface and the substitution of clamping electrodes for the resistance heaters, which electrodes are clamped as described previously. When the temperature of the glass approximates its strain point, voltage is applied to the heating strips to assist the glass to assume the shape of the supporting mold. When the glass sheets have conformed to the mold shaping surface, the two shaped glass sheets are removed from the mold, separated from one another and laminated with a thermoplastic material therebetween to form a complete windshield. A preferable method of laminating glass to plastic is described in U. S. Pat. No. 2,948,645 to Laurence A. Keim.

Any well known commercial plate, float or sheet glass composition or any other transparent glass generally used in windows is suitable for use in the present invention. Particularly suitable compositions are those of the soda-lime-silica type which may include or exclude a glass tinting composition such as about one-half per cent of iron oxide. The glass sheet is preferably between about 0.05 inch and 0.13 inch thick.

Preferably, the present invention relates to a window which has at least one ply composed of a commercial soda-lime-silica glass such as glasses having the following composition:

|  | Percent By Weight |
|---|---|
| $Na_2O$ | 10–15 |
| $K_2O$ | 0–5 |
| CaO | 5–15 |
| $SiO_2$ | 65–75 |
| MgO | 0–10 |
| $B_2O_3$ | 0–5 |

A typical soda-lime-silica glass suitable for use in accordance with this invention has the following composition:

|  | Percent by Weight |
|---|---|
| SiO | 71.38 (usual variation 71 to 74%) |
| $Na_2O$ | 12.76 (usual variation 12 to 14%) |
| $K_2O$ | 0.03 (usual variation 0 to 1%) |
| CaO | 9.67 (usual variation 8 to 12%) |
| MgO | 4.33 (usual variation 2 to 5%) |
| $Na_2SO$ | 0.75 (usual variation 0.1 to 1.0%) |
| $Fe_2O_3$ | 0.15 (usual variation 0.1 to 1.0%) |
| $Al_2O_3$ | 0.81 (usual variation 0.1 to 1.0%) |

The plastic layer of a laminated window is selected from those materials which are flexible, optically transparent and, for bilayer windshields, are somewhat abrasion resistant. Further, the plastic materials, when laminated to a thin ply of glass to form a laminated window, should minimize the dangers of both lacerative and concussive injuries. To fulfill these latter two requirements, the plastic inner layer material is preferably a polyurethane resin or a polyvinyl acetal resin. Typical suitable polyurethane resins of the thermosetting type are described and claimed in U. S. Pat. No. 3,509,015 to Marco Wismer, Vernon G. Ammons and Michael E. Dufala, while suitable polyurethane resins of the thermoplastic type are described in U. S. Pat. application Ser. No. 155,944, filed June 21, 1971, the disclosure of which is incorporated herein by reference. A typical polyvinyl acetal resin is described in U. S. Pat. No. 2,400,957 to Stamatoff. More details on the preparation of polyvinyl acetal resins are found in U. S. Pat. No. 2,496,480 and U. S. Pat. No. Re 20,430. Various plasticized polyvinyl acetal resins are described in U. S. Pat. No. 2,372,522 and many well-known plasticizers for polyvinyl butyral are found in U. S. Pat. No. 2,526,728 to Burk et al.

The inner plastic ply is of uniform thickness from about 10 to 75 mils thick, but is preferably about 20 to 50 mils in thickness. Inner plastic plies of less than 10 mils in thickness are not recommended because thin plastic sheets of less than 10 mils thickness tear easily upon impact. Tearing decreases penetration resistance of the laminated structure, which presents the danger in a motor vehicle of an occupant being partially or completely ejected in an accident. Inner plastic plies of greater than 75 mils in thickness should not be used because they result in a more rigid laminated structure which increases the danger of concussive injuries upon heat impact. Also, thicker plastic plies increase the weight of the resultant laminated structure and reduce light transmittance.

The following compositions can be used as heating strips: nichrome ribbon, copper ribbon or braid, metal alloy ribbon, stainless steel tape, carbon tape, and the like.

The following compositions were actually used to bend pairs of glass sheets into V-shaped configurations. Table I recites the construction of the strips.

TABLE I

Compositions of Electroconductive Heating Strips

| COMPOSITION | Resistance Per Unit Length (Ohms per Linear Inch) |
|---|---|
| A. Nichrome strip ⅛ inch wide, .0056 inch thick | .078 |
| B. Nichrome strip 3/16 inch wide, .005 inch thick | .048 |
| C. Nichrome strip ¼ inch wide, .0063 inch thick | .027 |
| D. Carbon tape ¼ inch wide, .005 inch thick | .218 |
| E. Carbon tape ¼ inch wide, thick | .162 |

EXAMPLES

The following examples report several experiments to produce V-shaped bends in two glass sheets simultaneously. simultaneously. In each example, a pair of float glass sheets approximately 100 mils thick was mounted on a sectionalized outline bending mold with a parting material of a diatomaceous earth therebetween. An electroconductive heating strip was placed across the upward facing surface of the lower sheet in

TABLE II

DETAILS OF BENDING TRIALS

| Number and Composition of Strips | Initial Lehr Temperature (°F.) | Power Application Temperature (°F.) | Time Power Applied (Seconds) | 60 Cycle A.C. Volts | Maximum Current (Amperes) | Peak Power (Watts) |
|---|---|---|---|---|---|---|
| 1E | 800 | 930 | 480 | X | 13 | X |
| 1D | 800 | 960 | 600 | 31¼ | 10 | 313 |
| 1E | 800 | 960 | 765 | 34 | 10 | 340 |
| 1D | 800 | 960 | 540 | 33 | 12.5 | 413 |
| 2D | 800 | 960 | 805 | 24 | 17 | 408 |
| 1C | 800 | 960 | 895 | 36 | 20 | 720 |
| 1B | X | X | 871 | 49.7 | 20 | 994 |
| 1E | X | X | 675 | 52.2 | 13 | 679 |
| 1Ay | 800 | 985 | 805 | 64.5 | 15 | 968 |
| 2A | 800 | 985 | 655 | 37 | 20 | 740 |
| 1A | 800 | 985 | 675 | 53 | 12.5 | 663 |
| 1Ay | 800 | 985 | 710 | 55¼ | 12.5 | 691 |
| 1E | 800 | 960 | 755 | 32.5 | 14.5 | 471 |

Notes: X — not available
y — top plate broke each case. In some cases, an additional strip was applied over the upward facing surface of the upper glass sheet. Electrodes were connected to the ends of either the single strip or to the corresponding ends of the pair of strips to form two heating circuits arranged in parallel along the heating strips applied to the glass surfaces.

The glass-laden mold was introduced into a lehr maintained at a lehr temperature recorded in Table II. A thermocouple attached to the upper glass sheet surface about three to four inches from the heating strip and approximately midway between the side edges of the attached glass sheet recorded the glass temperature. When the recorded temperature reached a value listed as power application temperature, 60 cycle alternating current was applied between the electrodes at a recorded voltage for a period of seconds listed in Table II. The resulting maximum current in amperes and peak power in watts for each run is also tabulated in Table II. After bending was completed, the bent sheets were annealed by controlled cooling.

From the above results, it becomes apparent that less voltage is required to produce the sharp bend when two parallel heating circuits are used than when one heating strip is used. Furthermore, using two heater strips lessens the chance of glass breakage. In addition, when the electric power supplied does not exceed 50 watts per inch of length of said sharply bent portion, less breakage occurs.

A pleasant surprise discovered from this work is that a high voltage is not needed to impart a sharp bend to one or more glass sheets. In the past, thousands of volts have been applied along strips of electroconductive material applied to a glass surface to shape the glass. These experiments demonstrate that electric heat needed for V-shaped bends in glass can be obtained from ordinary line current from 110 volts A.C. or 220 volts A.C. using a step-down transformer. The lower voltage applications are safer for operating personnel to handle and reduce the load required of a local power system.

Also, in order to minimize glass breakage, it is recommended that the voltage be applied initially at a low value. The voltage can then be increased to a maximum value not exceeding line voltage, either by a gradual increase or by a stepwise increase.

The form of the invention shown and described in this disclosure represents an illustrative preferred embodiment and certain modifications thereof. It is understood that various changes may be made, such as applying an additional strip of electroconductive material across the lower surface of the lower sheet provided suitable precautions are taken to insulate the additional strip from a grounding connection through the metal mold, whereby the electrodes can be clamped to provide three parallel heating circuits, for example, as well as other changes that will become apparent from reading this specification, without departing from the gist of the invention as defined in the claimed subject matter that follows. It is also understood that each of a pair of glass sheets bent simultaneously to a V-shaped configuration may be laminated separately to a layer of plastic resin to form a bilayer window consisting essentially of a layer of glass facing outwardly of a vehicle in which the bilayer window is installed and a layer of plastic resin facing inwardly.

We claim:

1. In the method of bending a glass sheet to a shape comprising a sharply bent portion including applying against said portion to be sharply bent a narrow, elongated strip of electroconductive material, heating said glass sheet to a minimum temperature approximating its strain point and applying additional heat to said portion by applying electric power to said strip while said glass sheet is at least at approximately its strain point, the improvement comprising applying against said portion to be sharply bent a strip of electroconductive material which is between about one-eighth inch wide and about one-fourth inch wide, applying a voltage across said strip of a magnitude such that the electric power applied to said strip does not exceed 50 watts per inch of length, and bending the glass sheet in the heated portion thereof.

2. In the method according to claim 1, the improvement wherein said voltage does not exceed 220 volts.

3. In the method as in claim 1, the improvement wherein said treatment is applied simultaneously to two glass sheets while the latter are supported in bending relation to a glass sheet bending mold.

4. In a method of bending a pair of glass sheets simultaneously to a sharp bend wherein one portion of each said glass sheet is bent sharply with respect to another portion of said glass sheet along a line of sharp bending extending from edge to edge of said glass sheet and aligned with a corresponding line of sharp bending in said other glass sheet, by a combination of general heating supplemented by localized electric heating induced from a strip of electroconductive material disposed between the sheets in a region intersecting said lines of sharp bending and wherein said glass sheets are mounted in pairs in aligned relation to one another on a mold, the improvement comprising superimposing an additional strip of electroconductive material on the upper surface of the upper glass sheet of said pair in said region of sharp bending, each of said strips of electroconductive material being between about one-eighth inch wide and about one-fourth inch wide, simultaneously applying electrical power along the length of each of said strips of a magnitude such that the electrical power applied to each said strip does not exceed 50 watts per inch of length, and bending said pair of glass sheets in the heated region thereof.

5. In the method as in claim 4, the improvement wherein at least one of said strips is comprised of a flexible metal capable of reuse in bending additional pairs of glass sheets.

6. In the method as in claim 4, the improvement wherein at least one of said strips is comprised of a carbon tape.

7. In the method as in claim 4, the improvement wherein said electric power is applied at a voltage that does not exceed 220 volts.

8. In combination with the method as in claim 4, the additional steps of removing said bent sheets from said mold and laminating them to one another with a layer of plastic resin therebetween.

9. In the method as in claim 1, the improvement wherein said strip is comprised of a flexible metal capable of reuse in bending an additional glass sheet.

10. In the method as in claim 1, the improvement wherein said strip is comprised of carbon tape.

11. In the method as in claim 1, the improvement wherein said strip is comprised of nichrome ribbon.

12. In the method as in claim 4, the improvement wherein at least one of said strips is comprised of nichrome ribbon.

13. In the method as in claim 1, the improvement wherein said strip has a resistance of up to about 0.25 ohms per inch.

14. In the method as in claim 4, the improvement wherein each of said strips has a resistance of up to about 0.25 ohms per inch.

15. In the method as in claim 1, the improvement which comprises removing said strip after said glass sheet is bent.

16. In the method as in claim 4, the improvement which comprises removing said strips after said glass sheets are bent.

17. In the method as in claim 15, the improvement wherein said strip is capable of reuse in bending an additional glass sheet.

18. In the method as in claim 16, the improvement wherein said strips are capable of reuse in bending additional pairs of glass sheets.

* * * * *

UNITED STATES PATENT OFFICE
CERTIFICATE OF CORRECTION

Patent No. 3,795,501  Dated March 5, 1974

Inventor(s) Robert A. Jansson and Thomas J. Reese

It is certified that error appears in the above-identified patent and that said Letters Patent are hereby corrected as shown below:

Abstract of the Disclosure, line 1, after "bending" please add --a--.

Column 1, line 50, please change "2,557,893" to --2,557,983--.

Column 7, Table I, last line, after "wide," please add --.010 inch--.

Column 8, lines 1 and 2, please delete the word "simultaneusly.".

Signed and sealed this 17th day of September 1974.

(SEAL)
Attest:

McCOY M. GIBSON JR.
Attesting Officer

C. MARSHALL DANN
Commissioner of Patents